United States Patent Office 2,798,717
Patented July 9, 1957

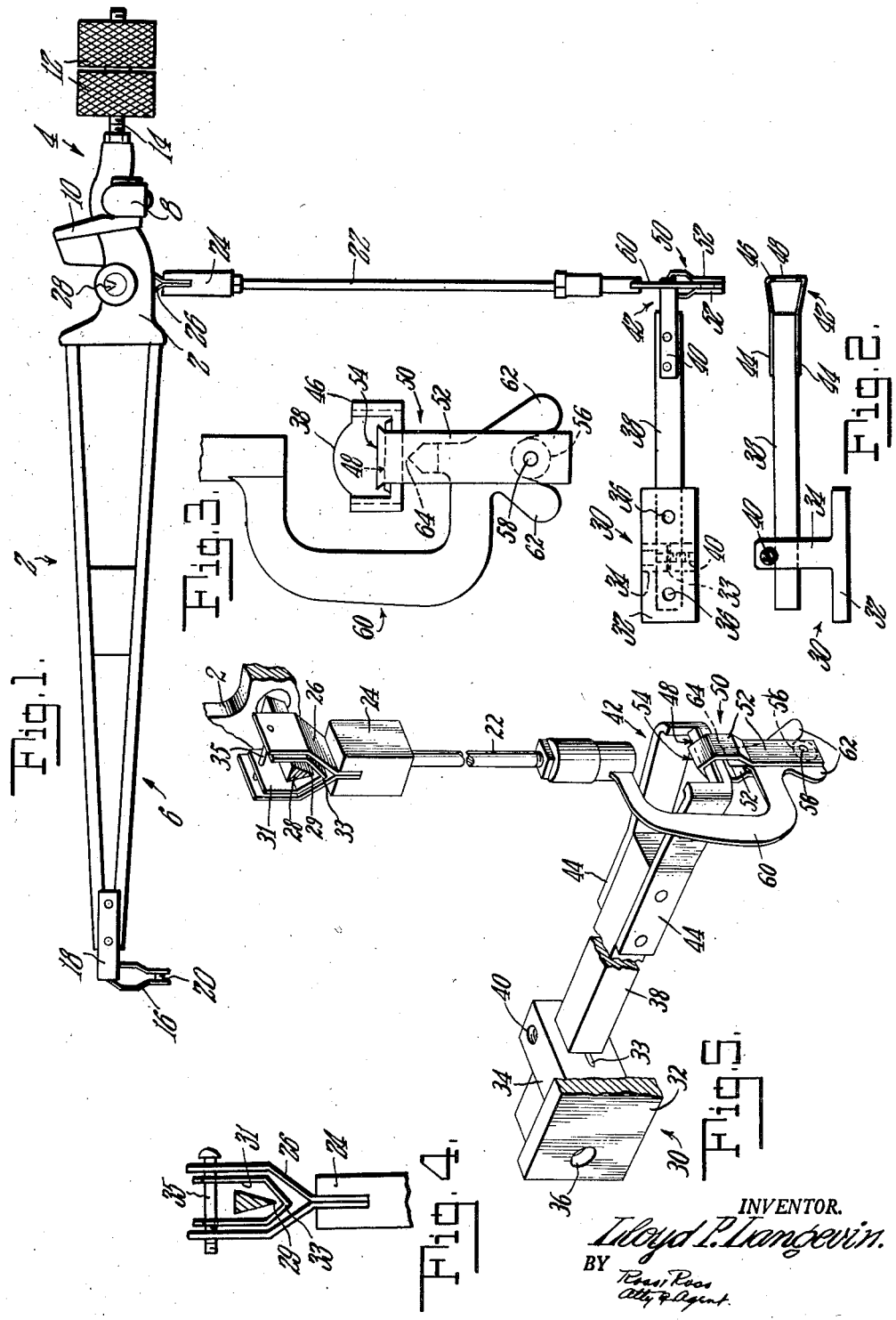

2,798,717

SCALES

Lloyd P. Langevin, Springfield, Mass.

Application March 26, 1954, Serial No. 419,018

1 Claim. (Cl. 265—29)

This invention relates to improvements in scales and is directed more particularly to scales used for counting groups of articles by weight.

Scales of the type to which the invention relates are adapted to weigh out groups of articles of predetermined count and include a system of connected together levers or ratio bars. These are arranged so that, with one or more articles in what may be called an "initial" pan, the scale is balanced when a certain number of articles are placed in the "final" pan.

That is, groups of articles of predetermined count are provided according to the arrangement of the ratio beams and the number of articles in the initial pan. As an example, the arrangement may be such that the scale balances to provide a thousand count of articles by using one article in the initial pan, or a count of two thousand by using two articles in the initial pan.

It is often desired to provide a count of articles such as screws, bolts, nuts and the like which is not possible due to the limits of the scale. For instance, it may be desired to provide a count of six gross or eight hundred sixty four articles where it is not possible by the ratio beam arrangement.

According to novel features of this invention, novel means is provided for adjustably connecting two ratio beams or levers such as a high ratio beam and an adjacent beam. By such means, the ratio arrangement of the beams may be altered so as to provide various counts in the final pan which is not possible where the ratio arrangement is more or less established.

The novel features of the invention make it possible to provide weighed counts within a wide range to satisfy various and numerous requirements.

All of the above objects, I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Fig. 1 is an elevational view of what may be called the high ratio beam of a scale having the novel connecting mechanism of the invention associated therewith;

Fig. 2 is a plan view of the mechanism shown in Fig. 1;

Fig. 3 is an enlarged side elevational view of the lower portion of the mechanism shown in Fig. 1;

Fig. 4 is a sectional view through the pivot of the upper high ratio beam; and

Fig. 5 is a perspective view showing the mechanism shown in Figs. 1, 2 and 3.

A beam is shown at 2 and represents what will be termed a high ratio beam of a scale. Said beam has a short arm 4 and a long arm 6 and is pivoted at 8 in the usual manner to a bracket 10 of a scale. Weights 12 threadedly engage a threaded stud 14 of the short arm 4 of the beam for balancing purposes.

A member 16 is pivotally suspended from a member 18 at the long end of the beam. A pan, which may be called an initial pan, is suspended from a part 20 of said member 16.

A connecting rod 22 has a rod end 24 in threaded engagement with the upper end thereof and a clip 26 carried by the said rod end is operatively and pivotally connected to a transverse member 28 of the long end 6 of the beam 2. The parts are so connected that, when an article in a pan suspended from member 16 swings the beam counterclockwise, the rod 22 moves downwardly.

As shown, the beam 2 has its long arm extending to the left and its short arm extending to the right of its pivotal connection with the part 10 of the scale.

The transverse member 28 has a lower knife edge 29, see Fig. 4. A U-shaped member 31 has a lower V-shaped lower end 33 for contact with the knife edge 29. The member 31 swings on a pivot 35 carried by the member 26.

Another beam, not shown, would be disposed below the beam 2 shown and its pivotal connection with the scale would be to the left of the pivotal connection 8 of beam 2. The long arm of the said lower beam would extend to the right and below the short arm of the beam 2 and its short arm would extend to the left.

The lower end of the rod is pivotally connected to the long arm of a lower beam by means now to be described.

A bracket 30 is provided with a flange 32 and a bearing 34 extending transversely therefrom. The flange 32 is provided with one or more openings 36 for screws or the like for securing the bracket 30 to the long arm of the lower beam referred to.

The bearing 34 is split at 33 and slidably receives a staff 38 which is slidable longitudinally relative to the bearing. A binding screw 40, threadedly engaging the split outer end of the bearing, clamps the staff in adjusted positions.

A U-shaped member 42 has side portions 44 secured to opposite sides of the staff 38 and is provided with an outer transverse end 46 having a horizontal knife edge 48 transverse to the longitudinal axis of staff 38.

A pivot hanger 50, which has spaced side arms 52, has a transverse upper end 54 resting on the knife edge 48 of member 42. A roll 56 between the side arms 52 of hanger 50 is supported by a pin 58.

A lower rod end 60 is in threaded engagement with the lower end of rod 22 and, as shown in Fig. 3, is in the form of a C. Wings 62, at the lower end of member 60, straddle the roll 56 as shown in Fig. 3.

Downward movement of rod 22 through the pivotal connection swings the long arm of the lower beam, to which the bracket 30 is secured, in a clockwise direction. The lower rod end 60 is provided with a knife edge 64 below the transverse part of member 42.

Thus the rod 22 is pivotally connected to the upper high ratio beam 2 at its long end and adjacent the pivotal connections of said beam with the scale while the lower end of said rod may be pivotally and adjustably connected to the long arm of a lower beam.

Relative angular movements of the ratio beam 2 and a lower beam may be varied as may be desired by sliding the staff 38 in the bracket bearing 34 to various adjusted positions so that various counts of articles in the final weighing pan may be provided relative to the article or articles in the pan of beam 2.

It is thus possible to alter the more or less definite ratio of articles in the initial and final pans within wide limits and provide various predetermined weighed counts of articles.

This invention may be embodied in other specific forms without departing from the essential characteristics thereof. Hence, the present embodiments are therefore to be considered in all respects merely as being illustrative and not as being restrictive, the scope of the invention being idicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

Mechanism for balancing scales in weighing out groups of articles of predetermined count in a final pan including a pair of interconnected spaced parallel ratio beams and related means for balancing the scales when the certain predetermined number of articles in a final pan is in direct ratio to a predetermined number of articles in an initial pan comprising, a rod pivotally connected at its upper end to one of the ratio beams, a bracket for securement to the other of the ratio beams, a staff movable axially in said bracket and having an outwardly extending free end, means to clamp said staff in said bracket, and pivotal connections connecting the lower end of said rod and the free end of said staff.

References Cited in the file of this patent

UNITED STATES PATENTS

| | | |
|---|---|---|
| 396,285 | McNeill | Jan. 15, 1889 |
| 617,903 | Morris | Jan. 17, 1899 |
| 924,962 | Boling | June 15, 1909 |